May 17, 1960   L. J. GIRARDIN   2,936,995
ACTUATOR LATCH MECHANISM
Filed March 27, 1958
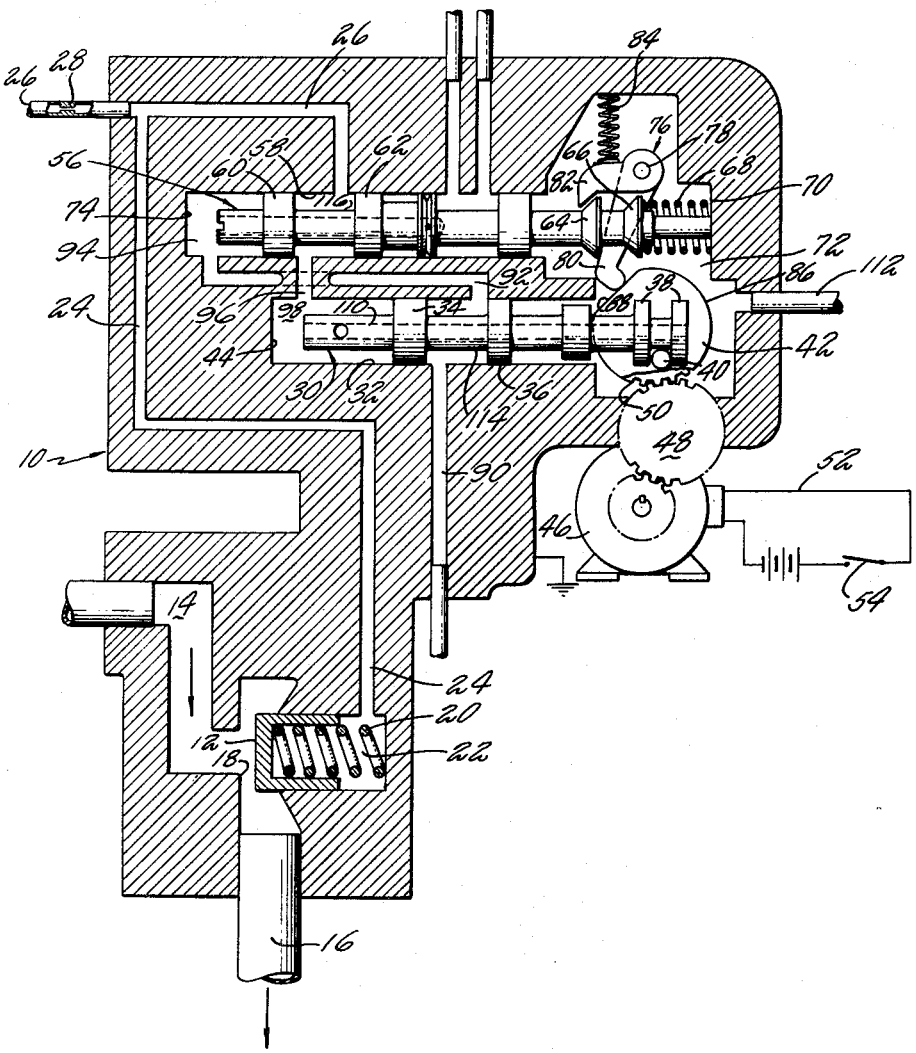
INVENTOR
LEON J. GIRARDIN
BY
ATTORNEY

United States Patent Office 2,936,995
Patented May 17, 1960

2,936,995
ACTUATOR LATCH MECHANISM

Leon J. Girardin, Tariffville, Conn., assignor to United Aircraft Corporation, East Hartford, Conn., a corporation of Delaware Application March 27, 1958, Serial No. 724,415

4 Claims. (Cl. 251—29)

This invention relates to a fuel system for a gas turbine power plant, more particularly to a latch mechanism for a pilot valve controlling one or more valves in the system.

In the fuel system for which this invention is intended the fuel shut-off valve is spring loaded closed and, further, it is pressurized closed by a fluid pressure. When fuel flow to the power plant is desired the pressure fluid behind the shut-off valve is vented through the translation of a pair of pilot valves. The first valve is translated by a manually induced movement and the second pilot valve is translated by a fluid pressure introduced thereto upon translation of the first pilot valve.

The latch mechanism of this invention controls translation of the second pilot valve. It permits the second pilot valve to be translated initially in response to the application of fluid pressure to one end of the pilot valve. It permits the pilot valve to be returned to its original position if the translational input signal to the first pilot valve is inoperative to restore the first pilot valve to its original position and cut-off the fluid pressure to the second pilot valve. Further, it prevents the second pilot valve from being translated by fluid pressure unless the fuel system is in proper working condition.

An object of this invention is to provide an improved latch mechanism to automatically control translation of a pilot valve.

Another object of the invention is to provide positive operation of a latch mechanism for a pilot valve without sacrificing any of the original requirements of the system in which the pilot valve functions.

Still another object of the invention is to provide a pilot valve latching mechanism having the necessary reliability to safeguard the system of which it is a part.

Other objects and advantages will be apparent from the following specification and claims and from the accompanying drawing which illustrates an embodiment of the invention.

In the drawing:

The single figure is a diagrammatic showing of the latch mechanism of this invention.

Referring to the drawing in detail, 10 is a fragmentary portion of a fuel control casing. The control includes shut-off valve 12 controlling the admission of metered fuel from passage 14 to manifold 16 and the power plant, not shown. The valve is urged to the left against seat 18 by spring 20 in chamber 22. Fluid is admitted to chamber 22 to aid in closing the valve, the fluid being admitted through branch passage 24 from passage 26. Bleed restriction 28 is in passage 26 immediately upstream of the connection with branch passage 24.

First pilot valve 30 is located within bore 32 in casing 10. The pilot valve has lands 34 and 36 on an intermediate portion thereof and a pair of shoulders 38 on its right end. The shoulders define a yoke engaging pin 40 which is eccentrically connected to cam 42. When no fuel is flowing to the power plant, pilot valve 30 is positioned to the left in bore 32 against end 44 of the bore. The pilot valve is translated to the position shown when it is desired to open valve 12.

Cam 42 rotates about an axis at a right angle to the axis of pilot valve 30. The cam is rotated by reversible electric motor 46 through gear 48 which meshes with gear segment 50 integrally connected with the cam. The electric motor is part of an electric circuit 52 which includes switch 54. One position of the switch operates the motor to rotate cam 42 in a counter-clockwise direction and translate pilot valve 30 to the right, while another position of the switch operates the motor to rotate the cam in a clockwise direction and translate the pilot valve to the left.

Second pilot 56 is located within bore 58 in the casing. The pilot valve includes lands 60 and 62 on its left end and beveled shoulders 64 and 66 on its right end. Spring 68 is mounted between the right end of the pilot valve and wall 70 of chamber 72 and loads the pilot valve to the left against end 74 of bore 58.

Latch mechanism 76 rotates about pivot 78 and through contact with beveled shoulder 64 on pilot valve 56 controls translation of the pilot valve. The latch mechanism consists of follower 80 and pawl 82. Spring 84 urges the latch mechanism in a counter-clockwise direction to maintain follower 80 in contact with the perimeter of cam 42. The cam perimeter is defined by a substantially circular section 86 and a flat section 88. As shown, follower 80 is against flat section 88 so that pawl 82 is in its extended or effective position. When the cam has been rotated so that follower 80 contacts circular section 86 the latch mechanism is retracted, that is rotated in a clock-wise direction from the position shown, so that the pawl is elevated above shoulder 64. Pilot valve 56 then may be translated without interference between the pawl and the shoulder.

Passage 90 is connected to an intermediate portion of bore 32 to supply a fluid pressure thereto. Passage 92 connects the same portion of the bore with chamber 94 at the left end of bore 58. Passage 26 is connected to an intermediate portion of bore 58 and passage 96 connects the same portion of the bore with chamber 98 at the left end of bore 32. Hole 110 extends through pilot valve 30 and provides communication between chamber 98 and chamber 72. Passage 112 connects chamber 72 to a suitable drain.

Operation

Prior to the opening of shut-off valve 12, the state of the fuel system and the position of the various control elements is as follows. Fuel is in passage 14, but the force of spring 20 as well as the pressure of the fluid in chamber 22, which may be that of the fuel in passage 14, holds the valve closed. Pilot valves 30 and 56 are each in a position to the left in their respective bores, and cam 42 is in a rotational position such that follower 80 is in contact with circular section 86 and pawl 82 is raised.

In the stated position of pilot valve 30 land 36 blocks the entrance to passage 92 and the fluid pressure admitted to bore 32 by passage 90 is dead-ended in groove 114 between lands 34 and lands 36. In the stated position of pilot valve 56 land 62 blocks the entrance of passage 26 to bore 58 to prevent the admission of fluid pressure to the bore.

To open shut-off valve 12, switch 54 is closed to actuate motor 46 and rotate cam 42 is in a counter-clockwise direction. The eccentric pin and yoke connection of cam 42 with pilot valve 30 will cause the pilot valve to be translated to the right, opening passage 92 and permitting the introduction of fluid pressure from passage 90 and groove 114 to chamber 94 at the left end of pilot valve 56. This fluid pressure will translate pilot valve 56 to the right against the force of spring 68 and without interference between shoulder 64 and pawl 82 since follower 80 is in contact with circular section 86 on the cam and the latch mechanism is retracted.

As pilot valve 56 is translated to the right, land 62 moves away from passage 26 to connect the passage and groove 116 between lands 60 and 62. This connection unloads shut-off valve 12, the pressure in chamber 22 being vented through branch passage 24, passage 26, groove 116, passage 96, chamber 98, hole 110, chamber 72 and drain passage 112. The pressure in chamber 22 thus is reduced so that the pressure in passage 14 will open valve 12 and fuel will flow through passage 16.

The above described events transpire as soon as communication is afforded by the movement of pilot valve 30 between groove 114 and passage 92. As counter-clockwise rotation of cam 42 and the resulting translation to the right of pilot valve 30 continues, follower 80 engages flat section 80 on the cam with the result that latch mechanism 76 drops to the position shown. Rotation of the cam and translation of the pilot valves is terminated when the elements are in the position shown in the drawing. The latch mechanism then is in its effective position.

Latch mechanism 76 affords a fail-safe provision in that in the event of a reduction of pressure in chamber 94, either intentionally or through malfunctioning of the system, shut-off valve 12 will be forced closed and cannot be reopened until the reason for the failure is determined. This provision is particularly important in an afterburner fuel system in which operation is intermittent and the power plant operator must be able to terminate operation or should be prevented from initiating operation. For example, if a failure in the electrical system occurs after pilot valve 30 has been translated to the right, motor 46 could not be actuated to rotate cam 42 and translate the pilot valve to the left to cut off the admission of fluid pressure to chamber 94. However, the fluid pressure in passage 90 could be reduced intentionally so that the force of spring 68 would exceed the pressure in chamber 94 and pilot valve 56 would be forced to the left. Land 62 then would close passage 26 and permit a pressure build up in chamber 22 to close shut-off valve 12. Further, if for some reason the fluid pressure in passage 90 should drop off, the consequent reduction of the pressure in chamber 94 would result in pilot valve 56 being moved to the left.

The shape of pawl 82 and that of shoulder 64 permits pilot valve 56 to be moved to the left when the latch mechanism is extended and when the fluid pressure in chamber 94 is reduced below the loading of spring 68. As soon as shoulder 64 has been moved to the left past pawl 82, the pawl drops down into the groove between shoulders 64 and 66. As long as follower 80 remains in contact with flat section 88, which will be as long as electric motor 46 is inoperative to restore cam 42 and pilot valve 30 to their original position, interference between the vertical face of pawl 82 and the vertical face of shoulder 64 will prevent pilot valve 56 from being translated to the right to permit shut-off valve 12 to be opened.

If operation of the fuel system has been normal, and the various elements are in the position shown in the drawing, shut-off valve 12 is closed and fuel flow is terminated by actuation of switch 54. The switch is moved to a position which will operate motor 46 and rotate cam 42 in a clockwise direction. This movement raises latch mechanism 76 and translates pilot valve 30 to the left. Land 36 on the pilot valve will cut off fluid pressure to chamber 94 at the left of pilot valve 56 and vent the chamber by the connection of passage 92 with chamber 72 and drain passage 112. As the pressure in chamber 94 diminishes spring 68 will translate pilot valve 56 to its original position at the left.

It is to be understood that the invention is not limited to the specific embodiment herein illustrated and described, but may be used in other ways without departure from its spirit as defined by the following claims.

I claim:

1. A fuel control including first valve means, means for actuating said first valve means, second valve means having translational movement, means controlled by actuation of said first valve means for admittting fluid pressure to said second valve means, said pressure tending to translate said second valve means in one direction, means acting upon said second valve means and tending to translate said second valve means in the opposite direction, cam means operatively connected with said first valve means and positioned in accordance with actuation of said first valve means, means actuated by said cam means for controlling movement of said second valve means in said one direction, and means for inactivating said cam actuated means when said second valve means moves in said opposite direction.

2. A fuel control including valve means, manually actuated means for translating said valve means, a pilot valve, means controlled by translation of said valve means for admitting fluid pressure to one end of said pilot valve, said pilot valve being translated in one direction by said pressure, resilient means loading said pilot valve in the opposite direction, cam means operatively connected with said valve means and positioned in accordance with movement of said valve means, and latch means positioned by said cam for controlling movement of said pilot valve.

3. A fuel control including a first pilot valve, manually actuated means for translating said pilot valve, a second pilot valve including a shoulder, means controlled by translation of said first pilot valve for admitting fluid pressure to one end of said second pilot valve, said second pilot valve being translated in one direction by said pressure, resilient means loading said second pilot valve in the opposite direction, cam means operatively connected with said first pilot valve and positioned in accordance with movement of said first pilot valve, latch means positioned by said cam for controlling movement of said second pilot valve, said latch means including a pawl cooperating with said second pilot valve shoulder, a portion of said pawl and a cooperating portion of said shoulder being contoured to move said pawl to a non-controlling position in response to translation of said second pilot valve in said opposite direction.

4. A fuel control including a first pilot valve, cam means operatively connected with said pilot valve, means for coordinately translating said pilot valve and rotating said cam means from a first position to a second position and return, a second pilot valve including shoulder means, resilient means loading said second pilot valve in an initial position, means controlled by translation of said first pilot valve to said second position for admitting fluid pressure to one end of said second pilot valve to translate said second pilot valve to a displaced position, latch means including a follower riding on said cam means and a pawl for cooperating with said second pilot valve shoulder means, said cam means being contoured to retract said latch means when said first pilot valve and said cam means are in said first position and to extend said latch means so that said pawl may engage said shoulder means when said first pilot valve and said cam means are in said second position.

References Cited in the file of this patent

UNITED STATES PATENTS

| | | |
|---|---|---|
| 288,331 | Haskell | Nov. 13, 1883 |
| 347,856 | Wiedling | Aug. 24, 1886 |